United States Patent [19]

Kawada

[11] Patent Number: 4,810,023

[45] Date of Patent: Mar. 7, 1989

[54] VISOR HOUSING ASSEMBLY AND EXPANDABLE SUN VISTOR HAVING VERTICALLY SLIDABLE PANEL MEMBER WITH PIVOTAL LATCH RETAINING MEANS

[76] Inventor: Shigeru Kawada, 21 Jackman Drive, Bramalea, Ontario, Canada, L6S 2T7

[21] Appl. No.: 128,076

[22] Filed: Dec. 3, 1987

[51] Int. Cl.$^4$ ............................................. B60J 3/02
[52] U.S. Cl. .............................. 296/97.8; 160/DIG. 3
[58] Field of Search ............... 296/97 G, 97 R, 97 C, 296/97 K, 97 H, 97 D; 160/DIG. 3

[56] References Cited

U.S. PATENT DOCUMENTS

| | | | |
|---|---|---|---|
| D. 281,413 | 11/1985 | Price et al. | 296/97 G |
| 2,228,209 | 1/1941 | Harrington | 296/97 G |
| 2,239,240 | 4/1941 | Magness | 296/97 G |
| 2,422,863 | 6/1947 | Stroth | 296/97 G |
| 2,829,919 | 4/1958 | Bartlett | 296/97 G |
| 3,282,623 | 11/1966 | Paro | 296/97 G |
| 3,306,657 | 2/1967 | Turner | 296/97 G |
| 3,375,364 | 3/1968 | Marcus | 362/61 |
| 3,853,370 | 12/1974 | Bernhart | 296/97 G |
| 3,948,554 | 4/1976 | Barbee | 296/97 C |
| 4,169,552 | 10/1979 | Lichtenstein et al. | 296/97 G |
| 4,195,876 | 4/1980 | Timperio | 296/97 G |
| 4,264,100 | 4/1981 | Keeler, II | 296/97 G |
| 4,284,474 | 2/1981 | Mandrick | 296/97 G |
| 4,323,275 | 4/1982 | Lutz | 296/97 G |
| 4,353,593 | 10/1982 | Henson | 296/97 D |
| 4,362,330 | 12/1982 | Cramer | 296/97 G |
| 4,486,819 | 12/1984 | Marcus et al. | 296/97 H |
| 4,570,990 | 2/1986 | Flowerday | 296/97 G |
| 4,653,798 | 3/1987 | White et al. | 296/97 R |
| 4,683,522 | 7/1987 | Viertel et al. | 296/97 G |
| 4,728,142 | 3/1988 | Gavagan | 296/97 G |

FOREIGN PATENT DOCUMENTS

1203268 4/1986 Canada .
1204133 5/1986 Canada .

*Primary Examiner*—James B. Marbert
*Attorney, Agent, or Firm*—Riches, McKenzie & Herbert

[57] ABSTRACT

A novel visor housing assembly for a sun visor for a motor vehicle, having a three-part construction comprising a frame member adapted to allow both a vertically slidable panel member, and a laterally slidable panel member to be located therein for slidable extension when desired from within the frame member, and front and back cover members adapted to enclose the panel members within the frame member. The visor housing assembly is provided with stop means adapted to co-act with the panel members so that when the cover members enclose within the frame member the slidable panel members, their slidable removal from the visor housing assembly is prevented. In another aspect the invention comprises an expandable sun visor having a vertically slidable retractable panel member, having a novel pivotable latch means in combination with a manually depressable release means, allowing the vertical panel member to be positively retained in a desired position.

17 Claims, 5 Drawing Sheets

VISOR HOUSING ASSEMBLY AND EXPANDABLE SUN VISOR HAVING VERTICALLY SLIDABLE PANEL MEMBER WITH PIVOTAL LATCH RETAINING MEANS

INTRODUCTION

This invention relates to a visor housing assembly for a sun visor in a motor vehicle, and more particularly to a visor housing assembly having cavity portions and slot means to accommodate a laterally slidable panel member, and a vertically slidable panel member, which may be extended when desired from within said visor housing assembly to provide additional glare protection to an operator of a motor vehicle. This invention also relates to an expandable sun visor device for a motor vehicle having a vertically slidable panel member with a pivotal latch retaining means for preventing unintended displacement of the vertically slidable panel member.

BACKGROUND OF THE INVENTION

In relation to visor housing assemblies, numerous prior art sun visors exist, adapted to accommodate various types of slidable extensible panels located therein, which serve as additional shading or glare protection for operators of motor vehicles.

U.S. Pat. No. 4,264,100, for example, discloses a unitary opaque windshield visor defining a compartment for storing a glare shield, wherein the visor compartment is pivotable about a longitudinally extending pivot upward to a stored position, and downward to an operative position for shielding the operator's eyes from the sun. The visor body is provided with an opening along a first longitudinal edge to allow a glare shield to be slidably received in the compartment and extended through the opening.

U.S. Pat. No. 4,353,593, in one aspect thereof shown in FIGS. 5-7 discloses a panel visor housing open along the bottom and sides, to allow for slidable movement laterally along a track and vertically by two C-shaped hoding members. Fastening elements are used to seal mating halves of the panel visor closed.

U.S. Pat. No. 4,323,275, generally discloses a housing in the form of a glare shield assembly detachably connected to a motor vehicle sun visor pivotally mounted for rotation about a generally horizontal axis, wherein the housing has a hollow interior and groovings in the interior walls and having slotted end and front walls, to allow for slidable extension of primary and secondary laterally slidable members, and a vertically slidable tertiary member.

Still other prior art, such as U.S. Pat. No. 4,570,990, teach a visor body including two substantially hollow core halves each of which possess a surface which mates with a corresponding surface on the other core half, and upholstery material surrounding the core halves. The core halves possess peripheral edge portions around which are wrapped edges of an upholstery material, and when said core halves are fused together to form the visor housing assembly, the upholstery material is additionally secured to the core halves by being compressed intermediate the peripheral edges of each of the core halves.

Accordingly, while prior art devices disclose sun visors which allow slidable panel members to extend outwardly therefrom, none specifically disclose particular visor housing assemblies nor any particular construction thereof to accommodate such panel members. Moreover, while numerous visor housing assemblies having a two-part construction achieved by joining mating halves thereof appears known, as evidenced by U.S. Pat. Nos. 4,353,593 and 4,570,990, none of the prior art patents or sun visors currently or previously in use on production automobiles disclose or teach a three-part construction of a visor housing assembly including a single substantially planar frame member having a rim, and two cover members adapted to be affixed thereto, as in the present invention, nor any of the advantages that may be realized therefrom. In particular, one particular advantage of the present invention is the provision of a frame member and rim which may further be adapted to house slidable panel members. Two separate cover members are later affixed to the frame member, after the slidable panels have inserted therein, to retain the panels within the visor housing, rendering removal of the panel members impossible without separation of the cover members. Lacking in the prior art is any teaching of a particular visor housing assembly that is capable of allowing easy and rapid insertion of slidable panel members.

Numerous prior art devices also exist for sun visor panels having retractable vertically slidable panel members, and means for preventing unintended displacement of such panel members.

U.S. Pat. No. 3,375,364 in particular discloses a vertically slidable vanity mirror which may be retained within said visor housing by means of retention or latch means. In a disclosed embodiment thereof, small magnets may be mounted within the visor near the top to retain the vanity mirror in the retracted position when its use is not desired.

U.S. Pat. No. 3,948,554 discloses an externally mounted vertically slidable panel member, restrained from unintended vertical displacement by frictional engagement of a carrier member with arm members which allow sliding of the panel.

Still other devices are known, such as U.S. Pat. No. 3,306,657, which teach an auxiliary visor attachment with externally protruding screw means to adjust the frictional engagement and ease of sliding of the vertically slidable panel.

Problems associated with each of the above prior art devices occur in that the no positive locking feature is explicitly provided for use with the vertically slidable panel member. Frequently, in a vibration prone environment such as an automobile, frictional braking devices or magnetic retaining means for the vertically slidable panel member are largely unsatisfactory in that they may allow gradual extension of the vertically slidable member when such extension is not desired by the operator of the motor vehicle. This occurence, while not only bothersome, can possibly also become a safety hazard if visibility of the operator becomes impaired. In the case of magnets, any jarring of the motor vehicle in which the sun visors of the prior art are installed could conceivably result in sudden extension of the vertically slidable panel member from a retracted position to an extended position, with unexpected obstruction of the motor vehicle operator's field of view.

Attempts to increase the frictional braking capability of the retention means to avoid the above problem of unintended extension have been largely unsuccessful since vertical sliding of the panel member is consequently made much more difficult to operate by an operator of a motor vehicle, particularly when attempting to forcibly reposition the slidable panel member into a retracted position within the visor housing while driving.

Where adjustable friction means are provided for on the visor housing, as in U.S. Pat. No. 3,306,657, the result is rather unaesthetically pleasing. In addition, such mechanisms introduce further required manipulation by the operator of a motor vehicle, which is not only difficult to do when driving, but also prevents a serious safety hazard.

Other prior art devices exist, such as that disclosed in U.S. Pat. No. 3,853,370 which teach a clamping base assembly for clamping a visor extension thereto, further having spring retaining means for retaining the slidable visor extension member in a retracted position. Such patent further discloses guide slot notches which allow the slidable visor extension to be manipulated so as to be restrained in the extended position when its use is desired.

This configuration, while offering a positive locking means to restrain the visor extension from unintended movement, is awkward to manipulate. Furthermore, such configuration allows undesirable and annoying vibration of the visor extension within the guide means, since no flush abutting contact of the visor housing guide means, and visor extension is possible due to the space necessary to allow manipulation of the visor extension to a locking position. Moreover when a clamp-on visor extension as disclosed in the above patent is provided, rather than a specially adapted visor housing for retaining the vertically slidable panel therewithin, the risk of injury to the driver from protruding parts is greatly increased in the case of a motor vehicle accident. In the present invention, in which a retractable vertically slidable panel member is provided, the risk of injury to the occupant of the vehicle from protruding components of the sun visor or visor housing assembly is eliminated, and is yet even further reduced when padded upholstery material is added to the exterior of the visor housing assembly.

SUMMARY OF THE INVENTION

The present invention, in one of its broad aspects, provides for a novel visor housing assembly for a sun visor that is simply constructed yet easily assembleable, and at the same time capable of being pivoted about a horizontal axis for movement from a generally horizontal axis for movement from a generally horizontal storage position to a downward generally vertical operative position. The novel visor housing assembly of the present invention may optionally accommodate a vertically slidable panel member, a laterally slidable panel member, or in a preferred embodiment thereof, may accommodate both a laterally slidable and vertically slidable panel member.

The visor housing assembly, in the preferred embodiment referred to above, is adapted to allow slidable withdrawal of either or both of the panel members from within the visor housing assembly by an operator of a motor vehicle to allow additional shading or glare protection for the operator.

The construction of the novel visor housing assembly of the present invention is essentially a 3-component construction, wherein a front cover member, and a back cover member are affixed to mating surfaces of a substantially rectangular frame member comprised of a rim portion which substantially forms the periphery of the frame member. Accordingly, in one of its broad aspects the present invention includes:

a substantially rectangular frame member having a rim forming generally the periphery of said frame member, further comprising socket means located in said rim proximate and parallel to a first upper edge of said visor housing assembly adapted to receive rod means to allow pivotal rotation of said frame member about a horizontal axisparallel to said first upper edge;

a front cover member affixed to a front side of said frame member; and a back cover member affixed to a back side of said frame member.

The visor housing is adapted to pivotably rotate about its horizontal axis from a generally horizontal storage position within a vehicle to a downward vertical operative position. The visor housing possesses a front side, defined as the side facing inwardly of the vehicle when the visor housing assembly is in the downward operative position, on which is a substantially planar surface adapted to be mutually overlaid by a mating surface on the front cover member. Similarly there is provided a back side on said rim mutually opposite the front side having a substantially planar surface adapted to be mutually overlaid by and affixed to a mating surface on the back cover member.

The advantages of this novel and easily constructed design over the prior art devices are more clearly recognized when the above visor housing assembly as further adapted to house both a laterally slidable panel member and also a vertically slidable panel member. This is accomplished by providing left and right slot means to allow slidable extension of the laterally slidable panel members from within the visor housing, and slot means to allow vertical extension of the vertically slidable panel means. Accordingly, because both panel members are required to be slidably retained within the visor housing assembly, each panel member must have a portion larger in area than the respective cavity or slot means, from which the sliding panel member is withdrawn, to abut stop means on the visor housing to prevent slidable removal of the panel member. For this reason the panel members cannot be slidably inserted into a closed or unitary visor housing assembly. The present invention provides a frame member having an exposed front and back side with planar surfaces thereon. The slidable panel members may be easily inserted into the frame member, and the respective front and back cover members subsequently snap-fitted and/or glued to the frame member to complete the assembly of the visor hosing, and render removal of the slidable panels impossible without separation of one of the front or back cover members.

Prior art devices, such as U.S. Pat. No. 4,323,275, recognize end limiting stops on the slidable panel members need be provided to prevent removal, but neither teach nor disclose a visor housing assembly which may be readily assembled, yet incorporate end limiting stops on the slidable panel members.

To aid in locating and affixing the respective front and back cover members on the frame member, protruding pin means spacedly located around the perimeter of each of the front and back cover members on the mating surface thereon may be provided to fittingly engage corresponding orifice means spacedly located on the front and back planar surfaces of the rim to allow the front and back cover members to be respectively attached to the frame member. Alternatively, the protruding pin means may be spacedly located on the front and back mating surfaces of the rim of the frame member, to engage corresponding orifice means spacedly located on the respective mating surfaces on the front and back cover members.

Further advantages of the three-component visor housing construction becomes apparent when upholstery material is desired to be added to the exterior of the visor housing assembly.

The attachable front and back cover member configuration with intermediate frame member of the present design allows upholstery material to be easily and speedily affixed to the visor housing assembly by a plant worker in a vehicle parts manufacturing plant, while eliminating the time consuming cutting and gluing involved in prior art designs, such as U.S. Pat. No. Des. 281,413, which required ensuring the upholstery material neatly surrounds a cavity means in the visor housing. More particularly, therefore, the present design provides for upholstery material to overlie front and back cover members, having peripheral edge portions of the upholstery material folded over the peripheral edge portions of the cover members. In this manner, the cover members, when fixedly attached to the respective front and back planar portions of the rim of the frame member, additionally secure the edge portions of the upholstery material to the sun visor by compressing the upholstery material around the peripheral edges thereof between the peripheral edge portions of the front and back cover members, and the planar surfaces on the rim of the frame assembly. In this manner, particularly where left and right slot means exist in the rim to accommodate a laterally slidable panel member, and a narrow slotted opening exists in the rim along an edge opposite the edge about which the visor pivots, all cutting and gluing of the upholstery material around these cavity portions and slot means is avoided, since the rim portion of the visor housing assembly in the present invention is intentionally designed to be unupholstered. This greatly reduces the manufacturing time in constructing the upholstered visor housing assembly.

In a second embodiment of the invention briefly referred to above, the visor housing assembly is contemplated as having left and right slot means located in the rim and extending respectively along substantially the left and right side edges of the rim, each slot means horizontally aligned with the other to allow passage therethrough of a laterally slidable panel member; linear channel means substantially parallel to the first edge of the rim adapted to allow slidable movement therewithin of a tab means protruding from said laterally slidable panel member; and stop means, which may be simply an abutting portion of the interior of the rim of the frame member, which abut the laterally slidable panel member to prevent slidable removal of the laterally slidable panel member from the visor housing assembly via either of the left or right slot means.

In a further refinement to this embodiment, respective left and right end portions of the linear channel means comprise the stop means, and the linear channel may be further adapted to allow slidable movement therewithin of a tab means protruding from the laterally slidable panel member. The respective left and right end portions accordingly abut the tab means on the laterally slidable tab member at the extremities of its lateral travel so as to prevent slidable removal of the laterally slidable panel member from within the visor housing assembly.

Guide means may further be added to co-act with and slidably contact the laterally slidable panel member so as to allow lateral slidable movement of the panel member within the visor housing assembly. In a preferred embodiment, the guide means is comprised of a guiding surface located intermediate the front and back sides of the rim, and parallel to the front and back planar surfaces thereof, and substantially surrounded about its periphery by the rim.

Frictional contact means may further be provided to frictionally contact the laterally slidable panel member so as to prevent unintended displacement of the panel member. In a further refinement of this feature, the frictional contact means is comprised of a web means affixed to at least one of the cover members, and protrudes from a side thereof having the mating surface, and is further resiliently biased so as to frictionally contact the laterally slidable panel member upon the cover member being affixed to the rim of the visor housing assembly. Such feature in addition to preventing unintended displacement of the panel member in the motor vehicle, also prevents unwanted vibration and resultant noise from the laterally slidable panel member, which frequently occurred in prior art sun visors having slidable panel members.

Accordingly, in a specific embodiment of this invention realizing this feature, left and right slot means are located within the rim, intermediate the parallel guiding surface and front planar surface of the rim, and the front cover member is provided with web means protruding from the side thereof having the mating surface. In this manner, when the front cover member is affixed to the rim on the front planar surface thereof, the web means frictionally contacts the laterally slidable panel member and is resiliently biased against it to force the laterally slidable member against the guiding surface.

In a separate third embodiment of the invention, the visor housing assembly as earlier described may be provided with a narrow slotted opening located along a second lower edge of the visor housing assembly opposite the first upper edge, adapted to allow slidable extension therethrough of a vertically slidable panel member to an extended position, and also stop means, adapted to co-act with the vertically slidable panel member so as to prevent further slidable extension via the narrow slotted opening of the vertically slidable panel member.

Similar to the second embodiment, the third embodiment may additionally be provided with guide means adapted to co-act with the vertically slidable panel member so as to allow slidable movement of the vertically slidable panel member within the visor housing assembly, and proper extension and retraction of the vertical panel member through the slot means. Again, the guide means may be comprised of a guiding surface located intermediate the front and back sides of the rim and parallel to the front and back planar surfaces thereof, and substantially surrounded about its periphery by the rim.

As a further refinement to the third embodiment, to overcome problems of unwanted extension of the vertically slidable panel member from the visor housing, the visor housing assembly of the present invention may be provided with resilient biasing means, such as a spring, to resiliently bias the vertically slidable panel member in a retracted position within the visor housing assembly. Simultaneously provided therewith are releasable lock means adapted to co-act with the vertically slidable panel member so as to releasably lock the vertically slidable panel member in the extended position when the panel member is manually withdrawn from the visor housing. When retraction of the vertically slidable panel member is desired, the releasable lock means may be manually activated so as to allow the vertically slidable panel member to be retracted within the visor housing assembly by the resilient biasing means.

Optionally, the resilient biasing means may be omitted, and releasable lock means provided adapted to co-act with the vertically slidable panel member so as to releasably lock the vertically slidable panel member in a retracted position within the visor housing assembly. This configuration allows the vertically slidable panel member to be retained within the visor housing assembly, even when the visor housing assembly is rotated about its pivotal axis downward to its operative position for providing shading to the operator of a motor vehicle, until its extension from the visor housing is desired by the operator, in which case the releasable lock means can be manually released.

In one embodiment, it is contemplated the releasable lock means may be in the form of a first magnetizable member affixed to the visor housing assembly and adapted to releasably adhere to a second magnetizable member affixed to the vertically slidable panel member.

In another embodiment, it is contemplated the releasable lock means comprises resiliently biased nub means, which protrude from the visor housing assembly, and are resiliently biased so as to engage a corresponding indentation on the surface of the vertically slidable panel member, so as to resiliently retain the vertically slidable panel member in a desired position until manual movement of the vertically slidable panel member causes disengagement of the resiliently biased nub means. Lastly, in a fourth preferred embodiment in which the advantages of the design of the visor housing are principally recognized, the visor housing assembly may be comprised of the combination of each of the features set out in the three embodiments described previously.

More particularly, the visor housing assembly as described earlier in the principal embodiment may be provided with means for accommodating both a laterally slidable panel member, and a vertically slidable panel member.

Accordingly, the visor housing assembly of the present invention may further be provided with left and right slot means located in said rim and extending respectively along substantially the length of left and right side edges of said rim, each horizontally aligned with the other to allow passage therethrough of a laterally slidable channel member;
  linear channel means substantially parallel to said first edge of said visor housing assembly, adapted to allow slidable movement therewithin of a tab means protruding from said laterally slidable panel member; and
  a narrow slotted opening located along an edge of said visor assembly opposite said first edge and parallel thereto adapted to allow slidable extension therethrough of a vertically slidable panel member to an extended position;
  first stop means adapted to coact with said vertically slidable panel member at said extended position so as to prevent further slidable extension via said narrow slotted opening of said vertically slidable panel member; and
  second stop means located on said visor housing assembly adapted to coact with said laterally slidable panel member so as to prevent slidable removal of said laterally slidable panel member from said visor housing assembly via either of said left or right slot means.

Advantageously, a single guiding surface, located on said rim intermediate the narrow slotted opening and the left and right slot means, may further be provided. In this manner, the vertically slidable panel member may be prevented from contacting the laterally slidable panel member within the visor housing assembly, while simultaneously allowing frictional contact on each of its sides so as to allow the vertically slidable and laterally slidable panel members to be guided for extension from the respective narrow slotted opening, and left and right slot means. As earlier described, web means located on the mating surface of the cover members may be provided, resiliently biased so as to force the respective vertically slidable or laterally slidable cover member into frictional contact with the guiding surface to prevent unintended displacement of the panel members and reduce vibration and resultant noise from the panel members within the visor housing assembly.

In this embodiment, linear channel means are provided to allow slidable movement therein of a tab means affixed to the laterally slidable tab member to further allow an operator of a motor vehicle to adjustably position the laterally slidable panel member. Accordingly, as any downwardly extending vertically slidable panel member would block an operator's access to the laterally slidable panel member if the laterally slidable panel member was located proximate the back side of the visor housing assembly, in the preferred embodiment, it is contemplated the visor housing be adapted to accommodate the laterally slidable panel member proximate the front cover member of the housing, and adapted to accommodate the vertically slidable panel member proximate the back cover member. More particularly, to provide an operator ready access to both vertically slidable and laterally slidable panel members, the left and right slot means are located on the rim closest the front side of the rim intermediate the guiding surface and the front cover member, and the narrow slotted opening is located on the rim closest the back side of the rim intermediate the guiding surface and the back cover member.

In another of its related aspects, the present invention provides for an extendable sun visor device for a motor vehicle, having a vertically slidable panel member, the improvement comprising provision of a novel pivotable latch means located on the vertically slidable panel member to positively retain the vertically slidable panel member in a desired position. The pivotable latch means on the vertically slidable panel member is adapted to lockingly engage the visor housing of the sun visor device so as to prevent unintended displacement of the vertically slidable panel member. Manually depressable release means, adapted to cause pivotal displacement of the pivotable latch means, are provided so as to allow easy disengagement of the latch means with the housing by the operator.

Accordingly, in this aspect of the invention, there is provided an extendable sun visor device for use in a motor vehicle, comprising:
  a visor housing assembly defining a cavity therein, the housing assembly having a first upper edge, and a narrow slotted opening along the length of a second lower edge opposite said first edge which communicates with said cavity, a vertically slidable panel member slidably received in said cavity for sliding via said opening between a retracted position within said cavity to an extended position in which the vertically slidable panel member extends therefrom through said opening, the housing assembly including guide means to guide said vertically slidable panel member in sliding between said retracted and said extended positions, latch means pivotably mounted on said vertically slidable panel member for pivoting between a locking position in which said latch means lockingly engages said housing thereby preventing sliding of said vertically slidable panel member, and a disengaged position which allows sliding of said vertically slidable panel member relative to said housing, and manually depressable release means actuable to pivot said latch means to said disengaged position.

Advantageously this aspect of the invention provides positive retention of the vertically slidable panel member relative to the sun visor device. Such configuration overcomes the problems inherent in prior art designs which to a large extent relied on non-positive locking devices, such as friction-contacting devices, to prevent unintended slidable displacement of a vertically slidable panel member within a sun visor. Moreover the provision of a manually depressable release means allows the positive locking means to be disengaged without any further manipulation of the vertically slidable panel by the operator, and allows the manually depressable release means, particularly when located on the exterior protruding edge of the vertically slidable panel member, to be operated by feel, rather than by sight.

Further, the visor housing may be configured so as to allow locking engagement by the pivotable latch means whenever the manually depressable release means is undepressed, so as to allow positive location of the vertically slidable panel member at any position between a fully retracted position, and a fully extended position.

In addition, to automatically retract the opaque or translucent vertically slidable panel member into the visor housing, resilient biasing means, such as a spring, may be provided to resiliently retain the vertically slidable panel member within the visor housing.

BRIEF DESCRIPTION OF THE DRAWINGS

Further objects and advantages will appear from the following detailed description of the invention, taken together with the accompanying drawings in which.

DETAILED DESCRIPTION OF THE INVENTION

Figure 1:
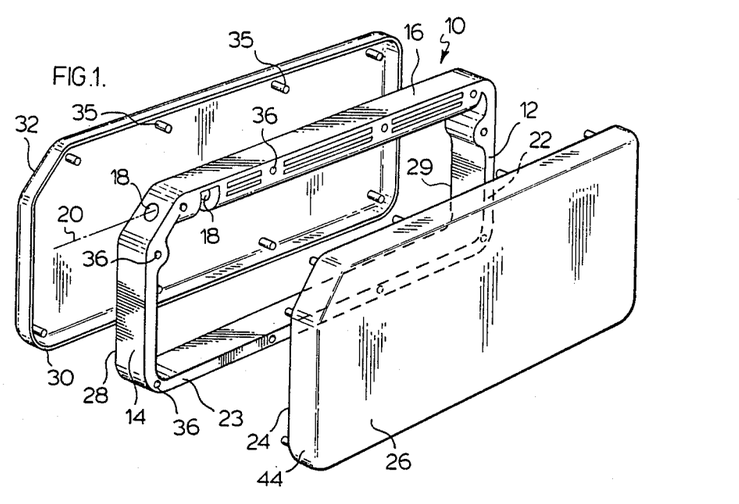
FIG. 1 is an exploded perspective view of the visor housing assembly of the present invention.

FIG. 1 shows a visor housing assembly 10 of the present invention, for use in a sun visor in a motor vehicle, having a substantially planar, rectangular frame member 12 having a rim 14 forming generally the periphery of the frame member 12. Located on the rim 14, or proximate a first upper edge 16 thereof, is a passage means 18 adapted to receive rod means (not shown) to allow pivotal rotation of the frame member 12 about a horizontal axis 20 parallel to said first upper edge for movement of the visor housing assembly 10 from a generally horizontal storage position to a downward generally vertical operative position.

The rim 14 of the frame member 12 has a front side 22 adapted to face inwardly of a vehicle when the visor housing assembly 10 is in a downward operative position. Located on the front side 22 is a planar surface 23 adapted to be mutually overlaid by a mating surface 24 on a front cover member 26 when the front cover member 26 is affixed to the frame member 12.

The rim 14 further possesses a back side 28 mutually opposite the front side 22 of the rim, having a planar surface 29 wherein the back side 28 is adapted to be mutually overlaid by a mating surface 30 on a back cover member 32 when the back cover member 32 is affixed to the frame member 12.

Figure 4:
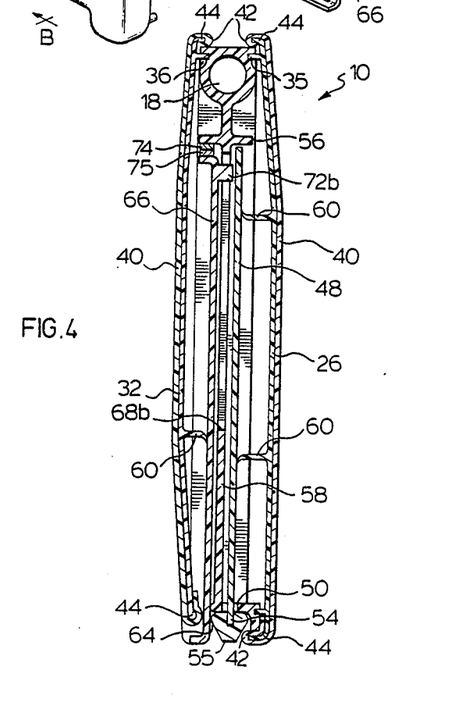
FIG. 4 is a sectional view of the embodiment shown in FIG. 3 taken along cutting plane B—B.
Figure 5:
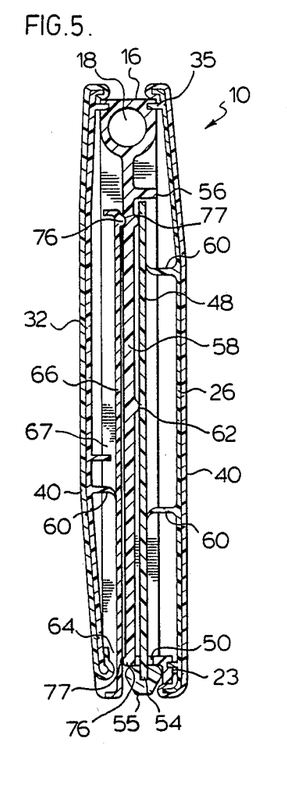
FIG. 5 is a sectional view similar to that shown in FIG. 4 of a further embodiment of the present invention.
Figure 6:
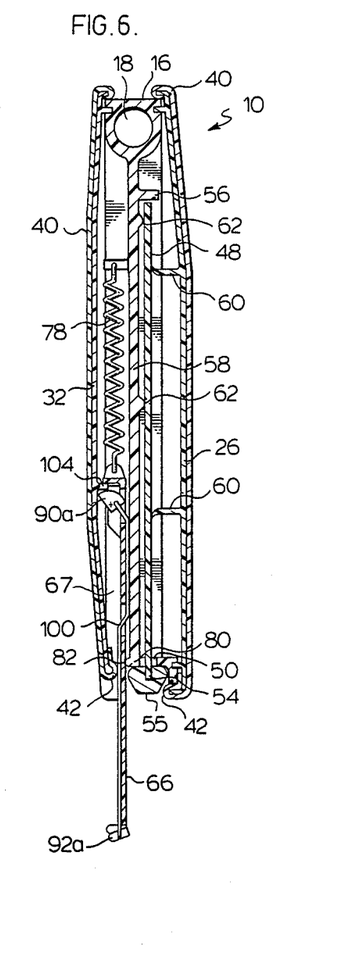
FIG. 6 is a sectional view similar to that shown in FIG. 4 of a further embodiment of the present invention.

It is noted that each of the front and back covers 26, 32 may be affixed to the frame member in a manner so that each of the planar surfaces 24,30 thereon abut the respective planar surfaces 23,28 on the frame member. Alternatively such cover members 26,32 may be mutually overlaid on the frame member so that the planar surfaces 24,30 surround the planar surfaces 23, 28 on the frame member, as shown in FIGS. 4, 5, & 6.

Pin means, in the form of cylindrical projections 35, may be spacedly located around the perimeter of each of the front and back cover members 26 and 32 respectively on the mating surfaces 24 and 30 thereon. Such pin means 35 may be adapted to fittingly engage corresponding orifice means 36 spacedly located on planar surfaces 23, 29 to allow the front and back cover members 26, 32 to be attached to the frame member 12. Glue may be used to attach the front and back cover members 26, 32 to the frame member 12, or alternatively, or in combination therewith, a snap-lock fit may be provided between the orifice means 36 and the pin means 35 to secure the front and back cover members 26, 32.

To provide an aesthetically pleasing appearance to the visor housing assembly, and further for safety reasons in case of motor vehicle accident, padded upholstery material 40 as shown in FIGS. 4-8 & 10, may be desired to be affixed to the exterior surface of the visor housing assembly. The upholstery material 40 may be placed so as to overlie the exterior surfaces of the front and back cover members 26, 32 with peripheral edge portions 42 folded over the respective cover edge portions 44 of each of the respective front and back cover members 26, 32. When the cover members 26, 32, more particularly their mating surfaces 24, 30, are fixedly attached to the respective planar surfaces 23, 29 of the rim 14, the cover edge portions 44 of each of the front and back cover members 26, 32 compress the peripheral edges 42 of the upholstery material 40 between such edge portion 44, and the respective planar surfaces 23, 29 of the rim 14, as shown in FIGS. 4–6, & 10.

To provide an operator of a motor vehicle additional glare protection and shading, the visor housing assembly 10, in particular the rim portion 14, in a second embodiment of the invention, may be modified by providing left and right cavities 46 each extending in a substantially vertical direction when the visor housing assembly is in a downward operative vertical position, along respective left and right side edges of rim 14, and each horizontally aligned with the other to allow passage therethrough of a laterally slidable panel member 48. Linear channel means 50 are provided on the visor housing assembly 10 parallel to the first edge 16 of the rim. Such linear channel means may be located within the front cover member 26, but preferably along the edge of the rim 14 opposite to edge 16 thereof, as shown in FIGS. 2–7. First stop means located on the visor housing assembly are further provided to co-act with the laterally slidable panel member 48 so as to prevent slidable removal of the laterally slidable panel member 48 from the visor housing assembly 10 via either of the left or right slot means 46. In a preferred embodiment shown in FIG. 2, the first stop means is comprised of respective left and right end portions 52 of the linear channel means 50, wherein the linear channel means 50 is further adapted to allow slidable movement therewithin of a tab means 54 protruding from the laterally slidable panel member 48. The end portions 52 of the channel means 50 are adapted to abut the tab means 54 to prevent further slidable movement of the tab means 54 and laterally slidable panel member 48 and prevent removal of the panel member 48 from the housing 10 once the cover members 26, 32 are affixed to the frame member 12. A knob means 55 may be affixed to the tab means 54 to allow for easy manual grasping and movement of the tab means 54, and laterally slidable panel member 48 by the operator to any desired position.

Figure 2:
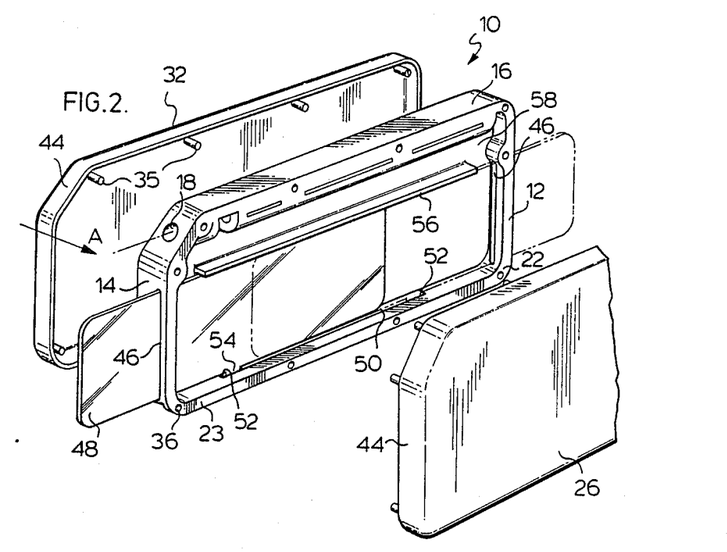
FIG. 2 is an exploded perspective view of a second further embodiment of the present invention.

Guide means 56 may further be provided to coact with and slidably contact the laterally slidable panel member 48 so as to allow lateral slidable movement of the laterally slidable panel member 48 within visor assembly 10. In a preferred embodiment, guide means 56 is comprised of a guiding surface 58 located intermediate the front and back sides 22, 28 of the rim 14 and parallel to the front and back planar surfaces 23, 29 thereof, and substantially surrounded about its periphery by the rim 14.

The visor housing may be further provided with frictional contact means adapted to frictionally contact the laterally slidable panel member 48, so as to prevent unintended displacement of the panel member 48, during for example, sudden turning of a motor vehicle, in which centrifugal forces acting on the panel member 48 might otherwise cause it to be displaced.

In a preferred embodiment, shown in FIGS. 2–6, the frictional contact means comprises web means 60 affixed to at least one of the cover members 26, 32 and protruding from the side thereof having the mating surface 23, 29. The web means 60 is adapted to be sufficiently flexible so as to allow it to be resiliently biased against the laterally slidable panel member 48 upon closure of the cover member 26 upon which the web means 60 may be located, so as to frictionally contact the laterally slidable panel member 48.

In a preferred embodiment, a guiding surface 58 is provided on the frame member 12, and left and right slot means 46 are located within the rim 12 intermediate the guiding surface 58 and the front planar surface 23 of the rim 12. The web means 60 is located on the front cover member 26, and is resiliently biased so as to frictionally contact the laterally slidable panel member 48 and compress such panel member 48 between the web means 60 and guiding surface 58, as shown in FIGS. 5 and 6. Protruding nubs 62 as shown in FIG. 5, 6 may be provided on the guiding surface, to engage optional corresponding grooves on the panel member 48, to increase both resistance to sliding, and provide a more localized point of frictional contact as well as an increase in the guiding capability of the visor housing 10.

In yet a third embodiment, either in combination with the first and second above-described embodiments, or simply in combination with the first embodiment, the visor housing assembly 10 of the present invention may be further modified by providing slot means 64, in the form of a narrow slotted opening, as shown in FIGS. 3–7 & 10, along substantially the length of an edge of the visor assembly 10 opposite the first edge, to allow slidable extension of a vertically slidable panel member 66 from a retracted position within the cavity 67 of visor housing 10, to an extended position exterior of the housing, to provide additional glare and sun shading protection for operators of motor vehicles. Such additional feature is particularly useful for short drivers, where the normal sun visor protection is insufficient. Second stop means are further provided, adapted to co-act with the vertically slidable panel member 66 so as to prevent further slidable extension via the slot means 64 of the panel member 66.

It is contemplated the second stop means may be constituted by an abutting surface 68 on the rim 14 of the frame 12. In a preferred embodiment, shown in FIG. 3, linear groove means 70a,b substantially perpendicular to said narrow slotted opening 64, and end of which constitutes the abutting surface 60a,b, may further be provided, allowing slidable movement therewithin of a protruding nub member 72a,b protruding from the vertically slidable panel member 66. The linear groove means 70a,b, may further be adapted to allow abuttment of the protruding nub member 72a,b with the abutting surface 68a,b thereof to prevent slidable removal of the vertically slidable panel member 66 from within the visor housing 10 via the narrow slotted opening 64.

Guide means, adapted to co-act with the vertically slidable panel member 66 may further be provided to allow guided slidable movement of the panel member 66 within the cavity 67 of the visor assembly 10. In a preferred embodiment, the guide means is comprised of a guiding surface 58 located intermediate the front and back sides 22, 28 of the rim 14 and parallel to the front and back planar surfaces 23, 29 thereof, and substantially surrounded about its periphery by the rim 14.

Figure 3:
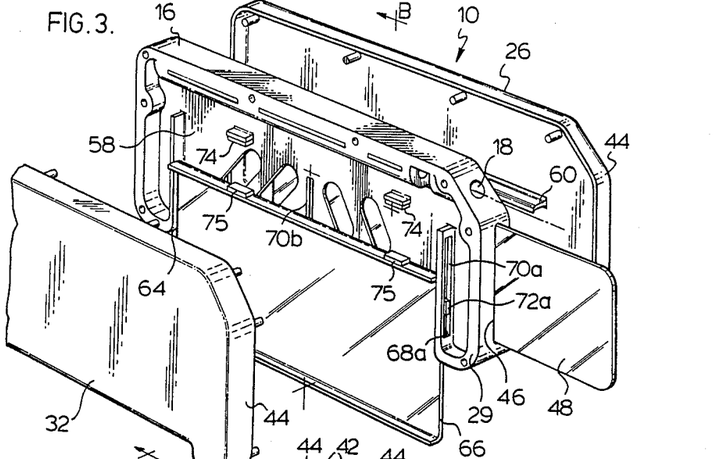
FIG. 3 is an exploded perspective view of a further refinement of the embodiment, shown in FIG. 2, taken in the direction of Arrow A as shown in FIG. 2.

In a further embodiment, the linear groove means 70a,b may be located within or on the guiding surface 58, as shown clearly in FIG. 3.

In order to allow an operator of a motor vehicle to grasp and slidably extend the vertically slidable panel member 66 from within the cavity 67 in the visor housing assembly 10, through the narrow slotted opening 64, in a preferred embodiment it is contemplated the back cover member 32, where the narrow slotted opening 64 in the frame member 12 is located closest the back cover member 32, be recessed along a length of a side thereof, opposite the first side 16 of the housing 10, as shown in FIGS. 3 & 4, to allow the vertically slidable member 66 to be grasped and extended from the visor housing 10.

In a fourth preferred embodiment of the invention, where it is contemplated the visor housing 10 be adapted to accommodate both a laterally slidable panel member 48, and a vertically slidable panel member 66, the advantages of the three-part construction of the housing become most clearly apparent.

In particular, where a guiding surface 58, as shown in FIG. 3, is provided on said frame member 12 and rim 14 for the purposes earlier explained, it is clear that in order to install both the vertically slidable panel member 66 and laterally slidable panel member 48, access must be had to both the front side 22 and back side 28 of the frame member 12, to allow the respective panel members 48, 66 to be installed on the respective desired side of the guiding surface 58.

Because the vertically slidable panel member 66, if located closest the front side of the rim 14 of the housing 10, in an extended position would effectively block a motor vehicle operator's hand attempting to slidably adjust the position of the laterally slidable panel member 48 using knob 55, in a preferred embodiment it is contemplated that housing 10 be adapted to accommodate the laterallly slidable panel member 48 in a region of the housing 10 closest the front side 22 of the rim 14, and that the housing 10 be adapted to accommodate the vertically slidable panel member 66 in the region of the housing 10 closest the back side 28 of the rim 14, and back cover member 32. In this manner the vertically slidable panel member 66 located proximate the back side 28 of the visor housing 10 may be adjusted as desired, and the laterally slidable panel member 48, located at the front side 22 of the visor housing 10 may also be adjusted, even when panel member 66 is in an extended position.

Accordingly, in a preferred embodiment, the frame member is provided with a guiding surface 58 parallel to the front and back planar surfaces 23, 29, and located within the frame member 12 intermediate the slot means 64 and the left and right slot means 46, and adapted to frictionally contact on one side thereof the vertically slidable panel member 66, and on its other side the laterally slidable panel member 48. In a further refinement thereto, the left and right slot means 46 are located on the rim 14 closest the front side 22 of the rim 14 intermediate the guiding surface 58 and the planar surface 23 on said front side 22, and the narrow slotted opening 64 is located on the rim 14 closest the back side 28 of the rim 14 intermediate the guiding surface and planar surface 29 on said back side 28 of the rim 14.

It is recognized in all embodiments of the visor housing assembly 10, and in an extendable sun visor device incorporating such assembly, where provision is made to allow slidable movement within such housing of a vertically slidable panel member 66, that releasable lock means may optionally be provided to restrain the vertically slidable panel member 66 from movement and allow retention of said panel member 66 in a desired position.

Accordingly, in a preferred embodiment it is contemplated the releasable lock means comprises a first magnetizable member 74 affixed to the visor housing assembly 10 and adapted to releasably adhere to a second magnetizable member 75 affixed to panel member 66 when the panel member 66 is in a retracted position within the housing 10, as shown in FIGS. 3 & 4.

In another embodiment (not shown), the releasable lock means may be comprised of a resiliently biased nub means protruding from the visor housing assembly 10, which may be resiliently biased so as to engage a corresponding mating indentation on the surface of the vertical panel member 66 when the vertically slidable panel member 66 is in a retracted position.

In a still further embodiment, web means 60 may be employed as part of the releasable lock means, wherein panel member 66 may be provided with a protruding nub 76 adapted to engage a mating indentation 77 on the visor housing assembly 10, more particularly on the guiding surface 58, as shown in FIG. 5. Web means 60 is adapted to resiliently bias the vertically slidable panel member, and the protruding nub 76 thereon, into mating engagement with the mating indentation 77 when the vertically slidable panel member 66 is in a retracted position within the visor housing 10.

In order to aid in the retraction of the panel member 66 into the visor housing 10, especially during operation of the motor vehicle with as little trouble to the operator thereof as possible, resilient biasing means, such as a coiled helical spring 78 may be attached to panel member 66 to resiliently bias the panel member in a retracted position within the housing 10. In combination with the housing 10 of the present invention, there is further provided releasable lock means, manually releasable by the operator to allow an operator of a motor vehicle to releasably retain the panel member 66 in an extended position, even when the panel member 66 is resiliently biased, until its use is no longer required.

Similar to the embodiment earlier described, such releasable lock means may comprise first and second magnetizable members 74, 75 affixed to the visor housing 10 and panel member 66 respectively to releasably retain the panel member 66 in an extended position. It is noted that the adhering force between the first and second magnetizable members 74, 75 is not so great that it may not be easily overcome by manual movement of the panel member 66, but is sufficiently great so as to prevent unintended release of the magnetizable members 74, 75 and subsequent retraction of the panel member 66 into the housing 10.

Figure 7:
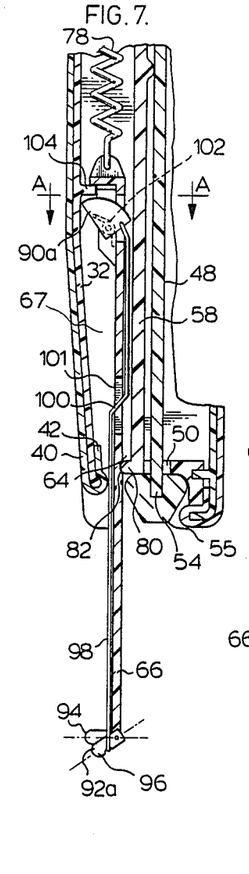
FIG. 7 is an enlarged detailed view of a portion of the embodiment shown in FIG. 6.

Alternatively, where resilient biasing means such as a spring 78 is incorporated, the releasable lock means may comprise a resiliently biased nub means 80 protruding from the visor housing assembly 10, resiliently biased so as to engage a corresponding mating indentation 82 on the surface of the vertically slidable panel member 66 when the panel member 66 is in an extended position, as shown in FIGS. 6 & 7. When the panel member 66 is wished to be retracted, the panel member 66 is simply pushed in the direction of the housing 10 to overcome the engaging relation between the protruding nub means 80 and the corresponding mating indentation 82, whereupon the resilient biasing means then automatically withdraws the slidable panel member 66 into the housing 10.

Figures 10, 11:
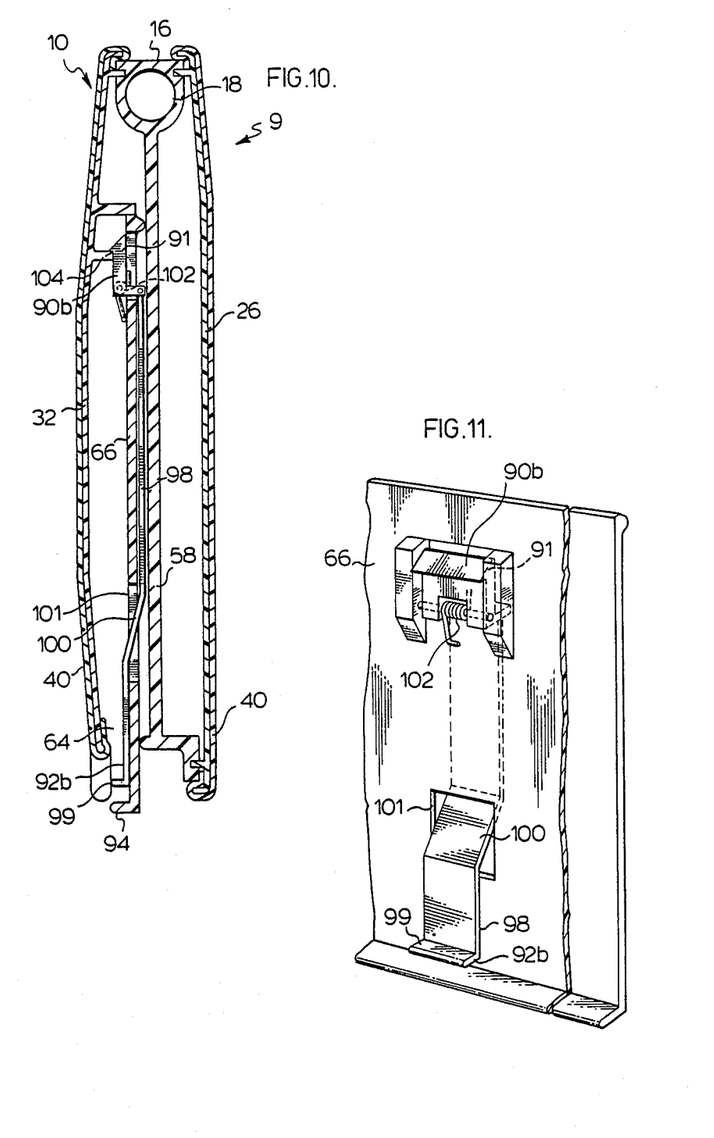
FIG. 10 is a sectional view similar to that shown in FIG. 4 of a further embodiment of the invention.
FIG. 11 is a perspective view of the vertically slidable panel and pivotable latch means shown in FIG. 10.

In a related aspect, the present invention further provides in another embodiment a novel sun visor device 9 for use in a motor vehicle, such device 9 having a vertically slidable retractable panel member 66, and a specially adapted positive locking means for locking the panel member 66 in a fixed position to avoid unintended displacement of the panel member 66, one embodiment thereof, shown most clearly in FIG. 10, and another shown in FIGS. 6 & 7.

In both embodiments, the specially adapted positive locking means comprises the combination of a pivotable latch means 90a,b and a manually depressable release means 92a,b. The pivotable latch means 90a,b is located on the vertically slidable panel member 66, and is adapted to lockingly engage the housing 10 to prevent unintended displacement of the panel member 66 relative to the housing. Manually depressable release means 92a,b are further provided adapted to cause pivotable displacement of the pivotable latch means 90a,b so ss to disengage the latch means 90a,b with the housing 10. In both embodiments, shown in FIGS. 6, 7, & 10, the manually depressable release means 92a,b is located proximate a lower edge or lip 94 of the panel member 66. It is contemplated the manually depressable release means 92a,b could also be located on the housing 10, and adapted at such location to be depressable so as to contact and releasably disengage the pivotable latch means 90a,b from engagement with the housing 10.

Manually depressable release means 92 is comprised of a pivotable tab 96 located on the visor housing, preferably pivotably mounted on a lower edge 94 of the panel member 66, and further comprising a latch connecting means 98 pivotably coupled at one end to the pivotable tab 96, and at the other to the pivotable latch means 90, as shown in FIGS. 6 & 7. Alternatively, manually depressable release means 92 may be in the form 92b, as shown in FIGS. 10 & 11, comprising a latch connecting means 98 pivotably coupled at one end to the pivotable latch means 90, and at its other end possessing a graspable portion 99 allowing the latch connecting means to be manually grasped, preferably pulled.

Figure 8:
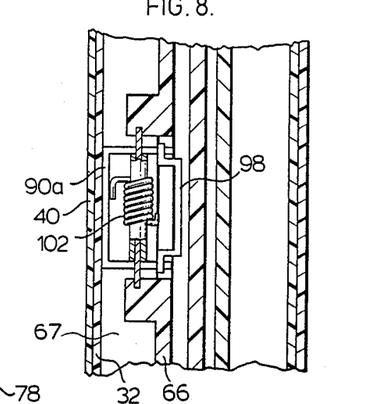
FIG. 8 is a sectional view along plane A—A of FIG. 7.
Figure 9:
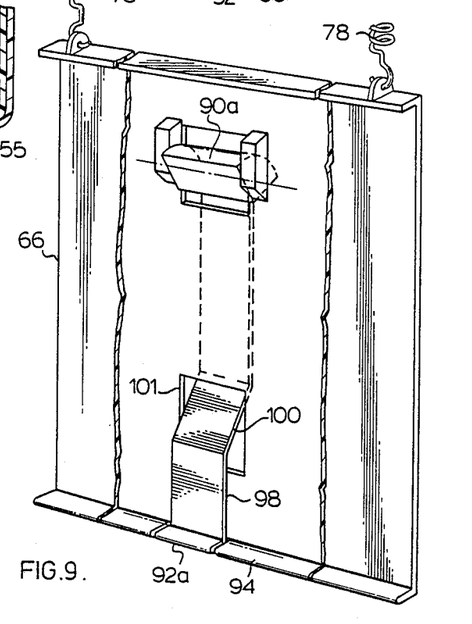
FIG. 9 is a perspective view of the vertically slidable panel and pivotable latch means shown in FIGS. 6 & 7.

It is further contemplated that the latch connecting means 98 may possess an angled portion 100 which allows it to slidably pass through an opening 101 in the panel member 66. Resilient biasing means, such as a helical coiled spring 102 as shown in FIGS. 7 & 8, is provided to resiliently bias the pivotable latch means 90a,b into locking engagement with the housing 10 until released from locking engagement therewith by the manually depressable lock releasing means 92.

Whether a pivotable latch means in the form shown as 90a, (see FIGS. 6, 7, 8, & 9) is employed, or a pivotable latch means in the form shown as 90b is used (see FIGS. 10, 11), is dependent upon whether a resiliently biasing means, such as a spring 78, is further operatively connected to the vertically slidable panel member 66 to resiliently bias the panel member 66 in a retracted position.

Where a resiliently biasing means, such as a spring 78, is operatively connected to panel member 66, a pivotable latch means 90a is employed. Such latch means 90a as shown particularly in FIG. 9, possesses a general cross-sectional "L" shape, wherein the upright leg thereof is resiliently biased to engage a protruding tab 104 provided on the visor housing 10. The protruding tab 104 is located in such a position that when the visor panel is moved to an extended position, the latch means 90a will slide over the protruding tab 104, and be resiliently biased in locking engagement therewith so as to prevent upward movement of the panel member 66. Upon manual depression of the release means 92, the pivotable latch means 90a is pivoted about a pivotable axis thereof so as to move away from engagement of the protruding tab 104, allowing the coiled spring 78 to withdraw the panel member 66 into a retracted position within the housing 10.

Alternatively, when no spring means 78 is provided, the pivotable latch means may be in configuration 90b, as shown in FIGS. 10 & 11, and having a similar "L" configuration, but with notch means 91 appearing on the exterior portion of the upright leg thereof. Such configuration 90b is adapted to lockingly engage a protruding tab 104 protruding from the housing 10 to allow the panel member 66 to be lockingly positioned in a retracted position, until extension of the panel 66 is desired, at which time the manually depressable lock releasing means 92 may be depressed to cause pivotable rotation of the "L" shaped pivotable latch means 90b to disengage engagement of notch means 91 on such latch means 90b with the protruding tab 104 on the visor. This allows the slidable panel member to be withdrawn from the housing 10, until such time as it may wish to be retracted. Upon retraction, the pivotable latch means 90b, due to notch means 91 thereon, slides over tab 104, to allow the notch 91 to lockingly engage the tab, preventing unintended extension of the panel 66.

Although the description describes preferred embodiments of the invention, it is not to be limited to such embodiments. Other variations may now become apparent to persons skilled in the art. For a complete definition of the invention, reference should be made to the claims appended to this specification.

The embodiments of the invention in which an exclusive property or privilege is claimed are defined as follows.

1. An expandable sun visor device for use in a motor vehicle, comprising:

a visor housing assembly defining a cavity therein, the housing assembly having a first upper edge, and a narrow slotted opening along the length of a second lower edge opposite said first upper edge which communicates with said cavity,     a vertically slidable panel member slidably received in said cavity for sliding via said opening between a retracted position within said cavity to an extended position in which the vertically slidable panel member extends therefrom through said opening,     the housing assembly including guide means to guide said vertically slidable panel member in sliding between said retracted and said extended position,     latch means pivotably mounted on said vertically slidable panel member for pivoting between a locking position in which said latch means lockingly engages said housing assembly thereby preventing sliding of said vertically slidable panel member, and a disengaged position which allows sliding of said vertically slidable panel member relative to said housing assembly, and     manually depressable release means actuable to pivot said latch means to said disengaged position said manually depressable release means carried by said vertically slidable panel member and comprising pivotable tab means pivotally coupled to said vertically slidable panel member, said tab means further coupled via a sliding linking member to said latch means, whereby manual depression of said pivotable tab means causes said latch means to pivot to said disengaged position.

2. The sun visor device as claimed in claim 1, wherein said latch means is adapted to lockingly engage said housing assembly when said vertically slidable panel member is in said retracted position.

3. The sun visor device as claimed in claim 1, further comprising:
resilient biasing means, biasing said vertically slidable panel member to the retracted position.

4. The sun visor device as claimed in claim 3 wherein said latch means lockingly engages said housing assembly when said vertically slidable panel member is in said slidably extended position.

5. The sun visor device as claimed in claim 3, wherein said resilient biasing means is a spring means.

6. The sun visor device as claimed in claim 5, wherein said spring means is a helical spring affixed at one end thereof to said housing assembly and at its other to said vertically slidable panel member.

7. The sun visor device as claimed in claim 1, wherein said latch means is resiliently biased to said locking position.

8. The sun visor device as claimed in claim 2, wherein said latch means is resiliently biased to said locking position.

9. The sun visor device as claimed in claim 1, said water housing further comprising:

10. A visor housing assembly for a sun visor in a mortor vehicle, comprising:
a substantially rectangular frame member having a rim forming generally the periphery of said frame member, further comprising socket means located in said rim proximate and parallel to a first upper edge of said visor housing assembly adapted to receive rod means to allow pivotal rotation of said frame member about a horizontal axis parallel to said first upper edge;
a front cover member affixed to a front side of said frame member;
a back cover member affixed to a back side of said frame member;
left and right lot means located in said rim and extending respectively along substantially the length of left and right side edges of said rim, each horizontally aligned with the other to allow passage therethrough of a laterally slidable panel member;
linear channel means substantially parallel to said first upper edge of said visor housing assembly, adapted to allow slidable movement therewithin of a tab means protruding from said laterally slidable panel member; and
first stop means located on said visor housing assembly adapted to coact with said laterally slidable panel member so as to prevent slidable removal of said laterally slidable panel member from said visor housing assembly via either of said left or right slot means.

11. The visor housing assembly as claimed in claim 10, said stop means comprising left and right end portions of said linear channel means, said end portions adapted to abut said tab means to prevent further slidable movement of the laterally slidable panel member.

12. The visor housing assembly as claimed in claim 10, further comprising:
a narrow slotted opening located along an edge of said visor assembly opposite said first upper edge adapted to allow slidable extension therethrough of a vertically slidable panel member to an extended position; and
stop means adapted to coact with said vertically slidable panel member at said extended position so as to prevent further slidable extension via said narrow slotted opening of said vertically slidable panel member.

13. The visor housing assembly as claimed in claim 12, wherein said narrow slotted opening is located in said rim.

14. The visor housing assembly as claimed in claim 12, further comprising:
resilient biasing means adapted to resiliently bias said vertically slidable panel member in a retracted position within said visor housing assembly; and
releasable lock means adapted to coact with said vertically slidable panel member so as to releasably lock said vertically slidable panel member in said extended position, wherein upon release of said lock means said vertically slidable panel member is retracted into said retracted position by said resilient biasing means.

15. The visor housing assembly as claimed in claim 14, wherein said releasable lock means comprises resiliently biased nub means protruding from said visor housing assembly resiliently biased so as to engage a corresponding mating indentation on the surface of said vertically slidable panel member when said vertically slidable panel member is in said extended position.

16. The visor housing assembly as claimed in claim 12, further comprising releasable lock means adapted to coact with said vertically slidable panel member so as to releasably lock said vertically slidable panel member in a retracted position within said visor housing assembly to prevent unintended extension thereof.

17. The visor housing assembly as claimed in claim 10, further comprising:
a narrow slotted opening located along a second lower edge of said visor assembly opposite said first upper therethrough of a vertically slidable panel member to an extended position; and
second stop means adapted to coact with said vertically slidable panel member at said extended position so as to prevent further slidable extension via said narrow slotted opening of said vertically slidable panel member.

* * * * *